(12) United States Patent
Shen et al.

(10) Patent No.: US 6,603,517 B1
(45) Date of Patent: Aug. 5, 2003

(54) VERY LOW COST DIGITAL TV MODULE

(75) Inventors: Richard C. Shen, Leonia, NJ (US); Sheau B. Ng, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 329 days.

(21) Appl. No.: 09/606,392

(22) Filed: Jun. 29, 2000

(51) Int. Cl.[7] ................................. H04N 5/45
(52) U.S. Cl. ....................... 348/565; 348/554
(58) Field of Search ................. 348/565, 566, 348/553, 554, 705, 706, 555, 564; H04N 5/45

(56) References Cited

U.S. PATENT DOCUMENTS

| | | | |
|---|---|---|---|
| 5,432,561 A | 7/1995 | Strubbe | 348/565 |
| 5,638,112 A | 6/1997 | Bestler et al. | 348/10 |
| 5,734,442 A | 3/1998 | Machado | 348/705 |
| 6,008,860 A * | 12/1999 | Patton et al. | 348/564 |
| 6,204,886 B1 * | 3/2001 | Yoshimura et al. | 348/564 |
| 6,333,731 B1 * | 12/2001 | Baek | 345/620 |

FOREIGN PATENT DOCUMENTS

WO    9844731 A1    10/1998

* cited by examiner

Primary Examiner—Michael H. Lee
(74) Attorney, Agent, or Firm—Laurie E. Gathman

(57) ABSTRACT

A method and device for adapting an existing analog television receiver to receive and decode both analog and digital television signals. A digital module is provided within the analog television receiver and its output is provided to the picture-in-picture (PIP) interface of an analog module within the receiver. The digital signal then has the benefit of using the picture improvement circuitry located within the analog module and there is no need to modify the analog module which has been in the cost optimization process for years.

20 Claims, 3 Drawing Sheets

VERY LOW COST DIGITAL TV MODULE

BACKGROUND OF THE INVENTION

1. Field of the Invention

The present invention relates in general to integrated analog/digital television receivers and in particular to a low cost method and device of providing a digital television receiver module in an existing analog television receiver.

2. Description of the Prior Art

Digital television services are presently being provided along with analog television services. During the time period of changeover from analog to digital it is necessary to have televisions which are able to operate in both the analog and digital environment.

The introduction of these digital television ("DTV") services presents architecture issues to the design of integrated digital/analog TV products. Since the initial integrated digital/analog television production volume is low, it does not make commercial sense to alter existing analog television components to accommodate functional integration of DTV components. This is because conventional analog television has been on the cost optimization process for many years and the fundamental analog architecture development has been following the functional integration path. More and more digital processing technologies have gradually replaced analog techniques for better performance and featuring and the analog functional integration is on the path toward a single IC execution with tightly coupled functionality and cross-sharing of processing blocks. While this approach enables the continued cost optimization of a conventional analog television set, the integration of DTV with analog TV poses a significant cost penalty. DTV employs compression-based techniques and it does not share much commonality with analog signal processing. To fully integrate DTV with conventional analog TV functionality based on existing analog chassis requires modifications to the analog chassis that are expensive. If the analog chassis is not modified, then in order to integrate DTV with the analog TV and have a high quality DTV signal, duplicate circuitry is needed so the output of the DTV module can be supplied directly to the display, thereby bypassing the analog chassis.

FIG. 1 shows a television 4 which includes an analog chassis 10 and a picture-in-picture (PIP) module 20. The traditional analog chassis 10 is an integrated circuit with a limited number of inputs and outputs including i) RF in 3 ii) the AV jack panel 2 attached directly to the analog chassis comprising AV1 in and AV2 in, iii) the host controller 19 inputs and outputs for control of all modules within the analog chassis 10 and PIP module 20, vi) the output to display 5, and vii) the inputs 11 and outputs 12 associated with the PIP functionality ("PIP interface"). Included within the analog chassis 10 is a tuner 15, an analog decoder 16, a multiplexer 18 and picture improvement circuitry 17. In order to incorporate the DTV module 30 in the present integrated analog/DTV receivers the DTV module 30 includes duplicate picture improvement circuitry 38 and the signal is multiplexed through multiplexer 40 on the output of the analog chassis 10 so that redesign of the analog chassis 10 is not necessary. Because the duplication of the picture improvement circuit is so expensive, many times this duplication is not even included in the design and the un-improved DTV signal at the output of the digital decoder 37 is provided directly to the display 5.

SUMMARY OF THE INVENTION

It is an object of the present invention to provide a low cost digital/analog television which does not necessitate redesigning the analog chassis and also enables the use of the same picture improvement circuitry in the analog chassis for the DTV signal. This object is achieved by providing a switched signal to the PIP interface of the analog chassis.

It is another object of the invention to provide a switched digital PIP input signal to the analog chassis, while preserving the same user experience with respect to the analog PIP. Thus digital PIP is an added feature without requiring the user to learn to operate additional keys on the remote control to turn on the digital PIP.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWING

For a better understanding of the invention, reference is made to the following drawings.

DESCRIPTION OF THE PREFERRED EMBODIMENTS

Figure 2:
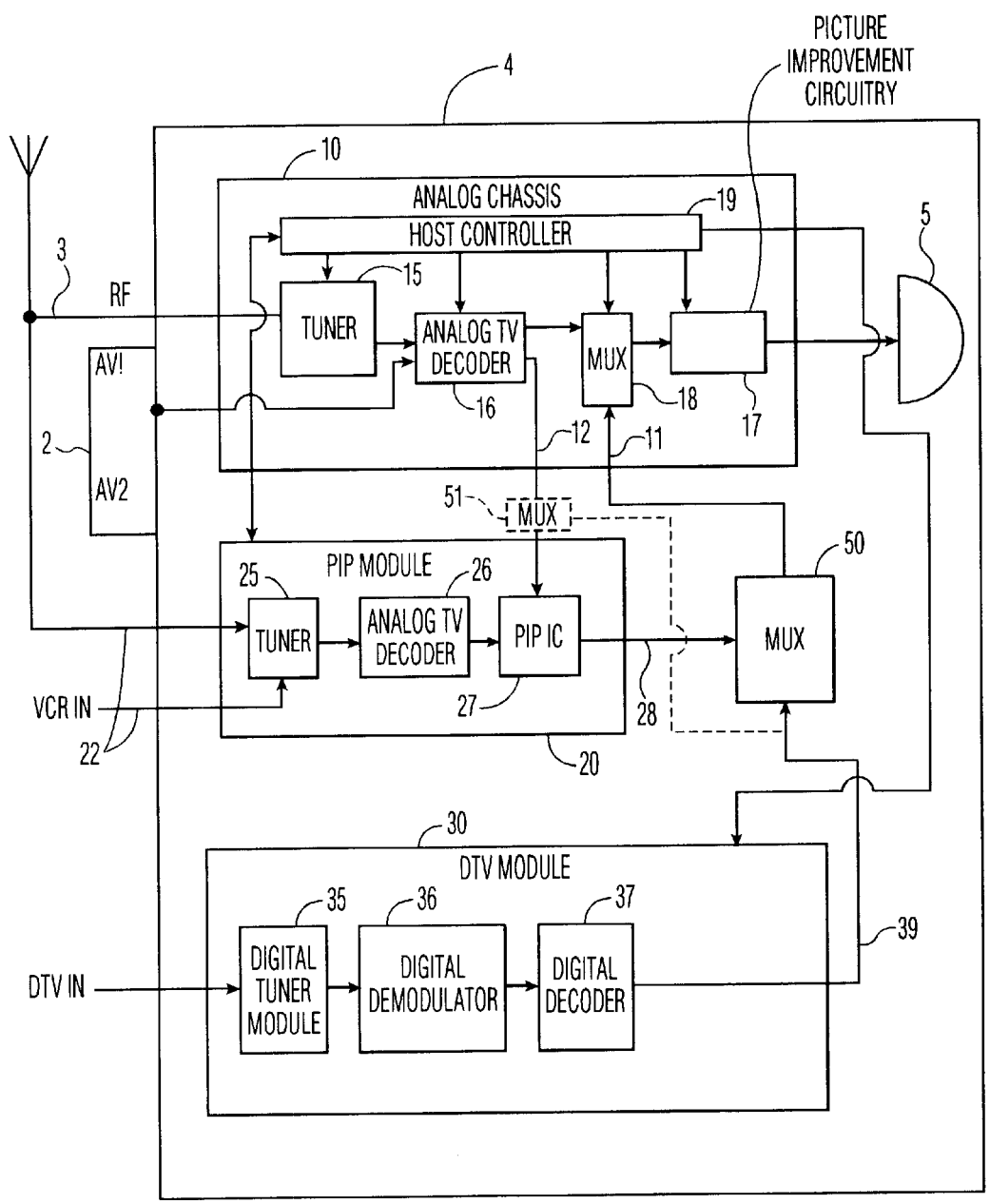
FIG. 2 shows a preferred embodiment of the instant invention.
Figure 3:
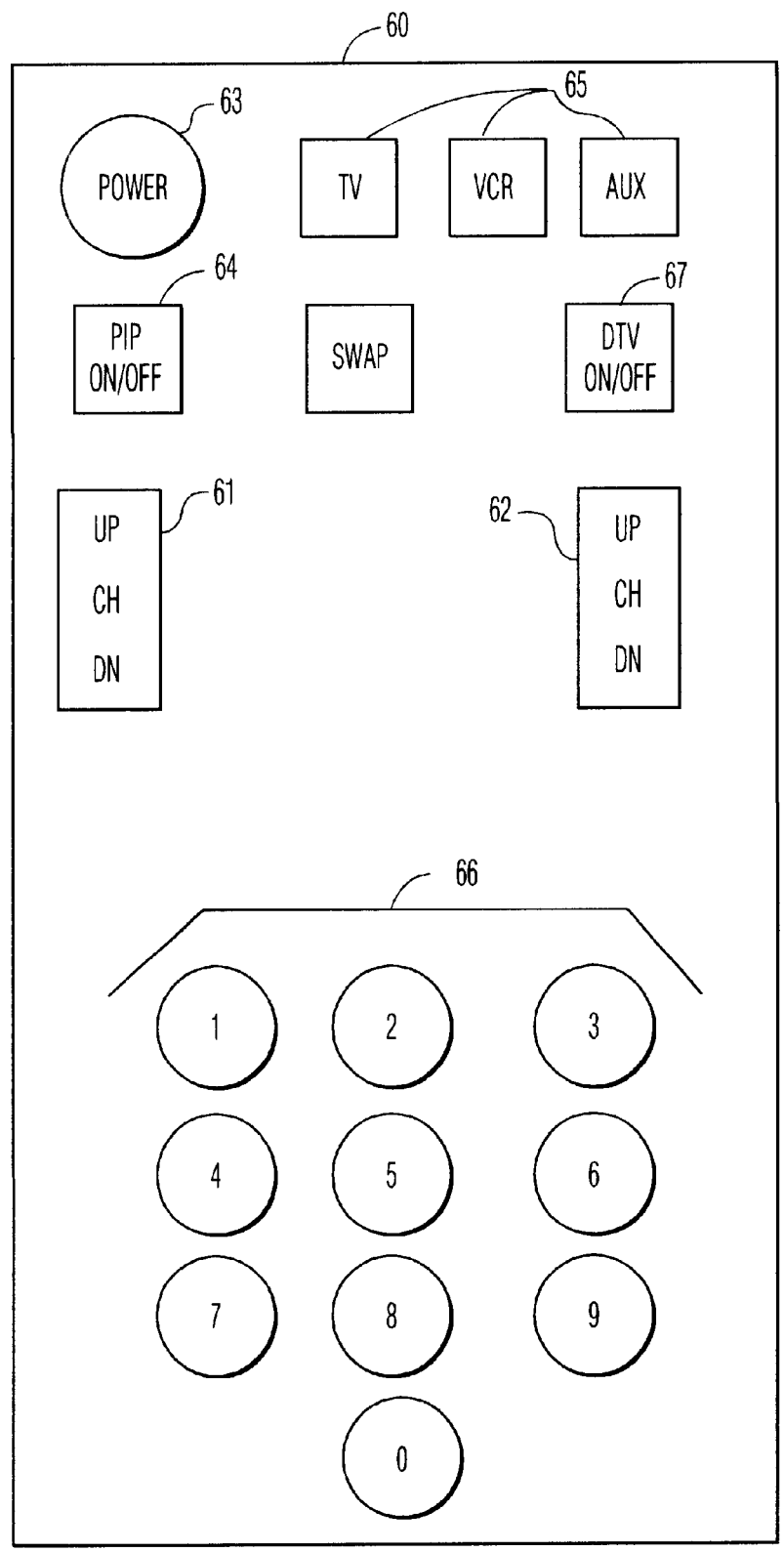
FIG. 3 shows a remote control in accordance with a preferred embodiment of the invention.

FIG. 2 shows a preferred embodiment of the instant invention. A television 4 is provided with an analog chassis 10, a PIP module 20 and a DTV module 30. The analog chassis contains a tuner 15, an analog television demo/decoder 16 and picture improvement circuitry 17. The tuner 15 processes terrestrial broadcast channels in the UHF and VHF bands. The tuner is controlled by the host controller 19 to select any channel out of the RF spectrum. The analog television demo/decoder 16 rejects interference from picture and sound carriers in adjacent channels and separates out the sound carriers and synchronization signals from the video of the tuned channel. The picture improvement circuitry 17 improves the brightness, contrast etc. of the video signal before it is displayed on the display 5. A multiplexer 18 within the analog chassis 10 selects between the output of the analog decoder 16 and the PIP functionality.

The input 3 of the analog chassis is coupled to an antenna or NTSC coaxial cable or some other analog video source. The jack panel 2 attached directly to the analog chassis 10 receives alternative or legacy video source inputs from such as VCR, DVD, etc. The host controller 19 provides control functionality for analog chassis 10 components, PIP module 20 components and DTV module 30 components. Multiplexer 18 has an input 11 for the output of the PIP module 20 for providing the composite PIP main signal 28. There is also an output provided to the display 5 for deflection circuitry and audio amplifiers.

The PIP module 20 accepts a plurality of inputs and includes a tuner 25 (although less expensive sets use the tuner from the VCR or some other video source) which selects any channel from the RF spectrum. An analog television demodulator/decoder 26 within the PIP module 20 rejects interferences from picture and sound carriers in adjacent channels and separates out the sound carrier and synchronization signals from the video of the tuned channel. The PIP IC 27 scales the video to 1/16 or 1/9 (or other arbitrary ratio) of its original size and combines the main signal 12 with the PIP signal received from analog decoder 26 such that the output of the PIP IC 27 contains a MAIN picture (from the analog chassis 10) with a smaller sub-picture in one quadrant (typically). The multiplexer 18 selects between the signal input from analog decoder 16 and the signal from the PIP module 20 provided on input 11.

One of the few inputs to the analog chassis is the PIP interface 11. Typically this input is reserved for the output of the PIP module 20. The multiplexer 18 switches between either the main signal from the analog decoder 16 or the composite PIP signal from PIP module 20. This PIP interface to the analog chassis 10 comprises one A/V output 11, one input 12 and I²C control from host controller 19. The PIP function in general is achieved by processing any of the two A/V inputs 22 to comprise a smaller combined video for output back to the analog chassis.

The digital television module 30 includes a digital tuner module 35 which receives digital ATSC broadcasts, performs IF filtering to reject adjacent channel interference and outputs a first or second IF signal to a digital demodulator 36. The digital demodulator 36 recovers the pilot carrier and clocking information, demodulates the symbols from the signal and decodes it. The output of the demodulator 36 is an ATSC transport stream containing audio, video and other kinds of data. The digital decoder 37 processes the transport stream to separate out and decode the transport stream. The output of the digital module 30 is provided to the multiplexer 50. Multiplexer 50 selects either the DTV signal from DTV module 30 or the PIP signal 28 from PIP module 20.

Figure 1:
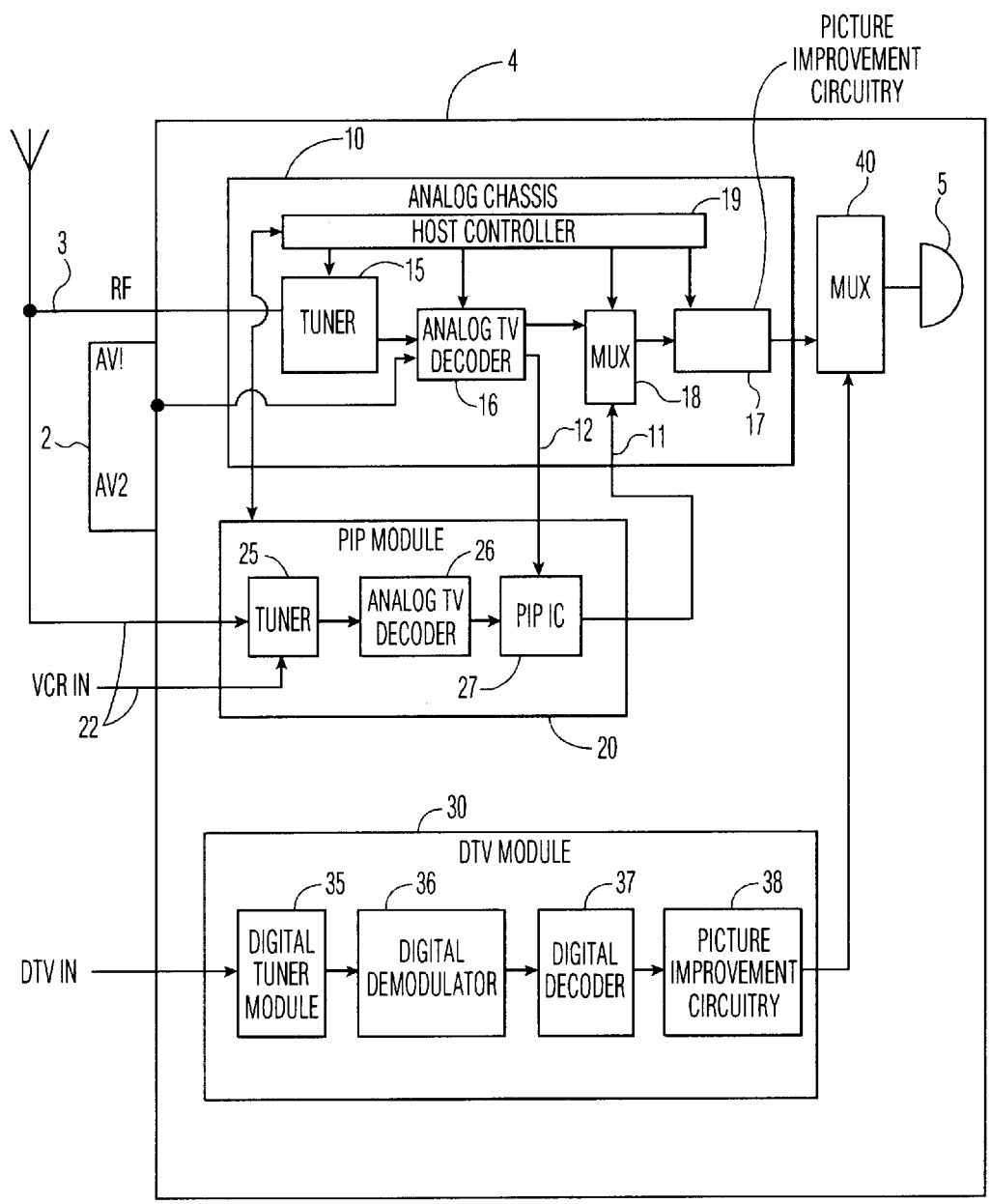
FIG. 1 shows a prior art integrated analog/DTV receiver.

As can be seen from FIG. 2, the DTV module 30 does not include the duplicate picture improvement circuitry as seen in FIG. 1 but takes advantage of the picture improvement circuitry 17 already available in the analog chassis 10 without modifying the analog chassis 10. In this application the DTV video is picture-enhanced by the existing analog improvement circuitry 17 on-board the analog chassis 10. Even though, it is not optimal to use analog picture improvement circuitry on a DTV signal, the overall viewer experience is preserved due to unified control and processing of video in the truest sense of an integrated TV and it provides an improved picture without the extra expense. In addition since a low cost integrated DTV typically will not have the display capability that is appropriate for HDTV video, any loss due to lower-performing picture improvement circuitry on the analog chassis is not very apparent. To achieve this result, the television 4, is provided with an additional multiplexer 50. This permits the PIP input 11 to be used for both PIP television and DTV as explained below.

The PIP module 20 has an output 28 that is provided to multiplexer 50. The DTV module 30, without additional picture improvement circuitry, also provides an output 39 to multiplexer 50. Multiplexer 50 selects between the analog PIP signal 28 or the DTV signal 39. The analog chassis 10 still sees only one signal on its input 11 from multiplexer 50. If the DTV signal is selected by multiplexer 50 it gets the use of the analog chassis picture improvement circuitry 17. This improvement allows for the clean, cost effective addition of a DTV module without the necessity of "breaking" into the analog chassis 10 and without adding additional picture improvement circuitry or alternatively displaying a much lower quality DTV signal. The digital TV decoder module 30 is thereby added as an additional A/V source to the analog chassis. The control of DTV reception and decoding is also performed by the host controller 19 located on the analog chassis.

Another benefit of the present invention is that it is not necessary to modify the PIP module 20 to accommodate the DTV signal if it is not cost effective to do so. Although if one wishes to add the multiplexer or switch 50 in the PIP module 20 this can also be an option.

The DTV decoder output 39 can also be a source for the PIP. This is achieved by adding a multiplexer 51 to select between the main and DTV module output for additional PIP featuring. The multiplexers 50 and 51 can be located on the DTV module 30 so that it is not necessary to modify the analog chassis 10 or PIP module 20.

Operation of the television is explained as follows. A remote control 60 is provided to control the functionality of the television. This remote control contains all of the typical features of a remote control including channel up/down 61, volume up/down 62, power on/off 63, PIP on/off 64, input selectors 65 and numerical keys 66 etc. The remote control also contains a DTV on/off button 67. If the PIP button 64 is depressed the tuner 25 provides an additional program to the PIP IC 27. The multiplexer 50 then selects the output 28 of the PIP module as the input 11 to the analog chassis. The multiplexer 18 of the analog chassis selects the PIP input 11 as the input to be displayed. The buttons of the remote control 60 then control the functionality of the smaller PIP picture such as changing the channel. If the DTV button 67 is depressed the remote control 60 controls the DTV picture by causing the digital tuner 35 to select the requested DTV program. The DTV program is then provided to the multiplexer 50 and the multiplexer 50 selects the output 39 as the input 11 to the analog chassis 10. The multiplexer 18 then selects the DTV signal as the signal to be displayed. The instant invention thereby provides a user friendly DTV experience.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall not be interpreted in a limiting sense and the scope of the invention shall be set forth in the claims.

What is claimed is:

1. A method of adapting an existing analog television receiver to receive and decode both analog and digital television signals, the analog television having i) an analog chassis to receive and decode analog television signals, ii) a PIP module to receive, decode and reduce the size of television signals, and iii) a digital module which receives and decodes digital television signals, the analog module having a PIP interface for receipt of a PIP signal from the PIP module, comprising the steps of:

coupling a first input of a switch to an output of the digital module;

coupling a second input of the switch to an output of the PIP module; and coupling an output of the switch to the PIP interface of the analog chassis.

2. The method according to claim 1 further including the steps of coupling the output of the digital module to a first input of a second switch;

coupling an output of the analog module to a second input of the second switch; and coupling an output of the second switch to an input of the PIP module.

3. A device for adapting an existing analog television receiver to receive and decode both analog and digital television signals, the analog television having an analog chassis to receive and decode analog television signals and a PIP module to receive and decode television signals to provide a PIP output, the analog chassis having a PIP interface for receipt of a PIP signal from the PIP module, comprising:

a digital module placed within the analog television receiver and which is capable of receiving and decoding digital television signals, and a switch having at least two inputs and an output, one input of the switch being coupled to the output of the digital module, and an output of the switch coupled to the PIP interface of the analog chassis, and the output of the PIP module coupled to a second input of the switch.

4. The device as claimed in claim 3, wherein the switch is located within the digital module.

5. The device as claimed in claim 4, wherein the switch is located within the PIP module.

6. The device as claimed in claim 3, further including a second switch having a first input coupled to the output of the digital module, a second input coupled to the output of the analog chassis and an output of the second switch coupled to an input of the PIP module.

7. A device for adapting an existing analog television receiver to receive and decode both analog and digital television signals, the analog television receiver having an analog chassis to receive and decode analog television signals and a PIP module to receive and decode television signals to provide a PIP output signal comprising:

a digital module for placement within the analog television receiver and capable of receiving and decoding digital television signals and providing a digital output signal; and a switch, switchably coupling the PIP output signal and the digital output signal to a PIP input of the analog chassis.

8. The device as claimed in claim 7, wherein the switch is located within the digital module.

9. The device as claimed in claim 7, wherein the switch is located in the PIP module.

10. The device as claimed in claim 7, further including a second switch for switchably coupling the digital output signal and an output of the analog chassis to an input of the PIP module.

11. The method as claimed in claim 1, further comprising the step of passing an output signal of said switch through said PIP interface and through picture improvement circuitry of said analog chassis.

12. The method as claimed in claim 1, further comprising the step of controlling said digital module with a host controller of said analog chassis.

13. The device as claimed in claim 3, in which said analog chassis comprises picture improvement circuitry and said output of said switch that is coupled to said PIP interface passes through said picture improvement circuitry.

14. The device as claimed in claim 3, in which said analog chassis comprises a host controller and said host controller controls said digital module.

15. The device as claimed in claim 6 in which said analog chassis comprises picture improvement circuitry and said output of said switch that is coupled to said PIP interface passes through said picture improvement circuitry.

16. The method as claimed in claim 2, further comprising the step of passing an output signal of said switch through said PIP interface and through picture improvement circuitry of said analog chassis.

17. The device as claimed in claim 6, in which said analog chassis comprises a host controller and said host controller controls said digital module.

18. The device as claimed in claim 10, in which said analog chassis comprises picture improvement circuitry and said output of said switch that is coupled to said PIP interface passes through said picture improvement circuitry.

19. The method as claimed in claim 1, further comprising the step of operating said switch with a remote control unit.

20. The method as claimed in claim 2, further comprising the step of operating said second switch with a remote control unit.

* * * * *